United States Patent [19]

Jaeger et al.

[11] Patent Number: 4,866,275
[45] Date of Patent: Sep. 12, 1989

[54] METHOD FOR THE ELECTRONIC PRODUCTION OF THERMAL IMAGE REPRODUCTION AND APPARATUS FOR CARRYING OUT THE METHOD

[75] Inventors: Walter Jaeger, Cureglia, Switzerland; Aldo Mazza, Rome, Italy

[73] Assignee: GX-Holding AG, Basel, Switzerland

[21] Appl. No.: 16,306

[22] Filed: Feb. 19, 1987

[30] Foreign Application Priority Data

Feb. 20, 1986 [CH] Switzerland ................. 00685/86

[51] Int. Cl.⁴ ............................................. G02F 1/01
[52] U.S. Cl. ................................... 250/330; 250/351
[58] Field of Search ................. 250/330, 332, 333, 334, 250/351, 350; 358/113

[56] References Cited

U.S. PATENT DOCUMENTS

| | | | |
|---|---|---|---|
| 3,476,029 | 11/1969 | Schreckendgust | 354/227.1 |
| 3,628,018 | 12/1971 | Desvignes | 250/351 |
| 4,063,093 | 12/1977 | Asthermer et al. | 250/330 |
| 4,072,863 | 2/1978 | Roundy | 250/330 X |
| 4,402,009 | 8/1983 | Rathjens et al. | 358/113 X |
| 4,466,748 | 8/1984 | Needham | 250/334 X |
| 4,481,535 | 11/1984 | Hodd et al. | 358/113 |
| 4,608,599 | 8/1986 | Kaneko et al. | 358/113 |
| 4,634,870 | 1/1987 | Metcalf | 250/351 X |

FOREIGN PATENT DOCUMENTS

| | | |
|---|---|---|
| 0138398 | 4/1985 | European Pat. Off. . |
| 20170908 | 12/1986 | European Pat. Off. . |
| 2731653 | 5/1978 | Fed. Rep. of Germany . |
| 2724890 | 12/1978 | Fed. Rep. of Germany . |
| 2919936 | 11/1980 | Fed. Rep. of Germany . |
| 3035240 | 4/1982 | Fed. Rep. of Germany . |
| 1559586 | 4/1977 | United Kingdom . |
| 1592500 | 8/1981 | United Kingdom . |
| 2150387 | 10/1983 | United Kingdom . |

Primary Examiner—Eugene R. LaRoche
Assistant Examiner—Seung Ham
Attorney, Agent, or Firm—Watts, Hoffmann, Fisher & Heinke Co.

[57] ABSTRACT

A method and system for producing a temperature image of an object by the use of a television camera head responsive to temporal changes in infrared energy and operating in accordance with the pyroelectric effect. A chopper modulator alternately inhibits and facilitates transmission of thermal energy from a subject to the television camera head viewing the subject. Video information produced during separate first and second time intervals is separately stored. Video information produced during a third time interval between the first and second time intervals is not used. Video information produced during a fourth time interval subsequent to the second time interval is also not used. A signal is produced which is a function of the difference between the stored video information corresponding to the first and second time intervals. This difference signal is employed, in combination with appropriate synchronization signals, to drive a television monitor to produce a thermal image of the viewed subject.

9 Claims, 2 Drawing Sheets

METHOD FOR THE ELECTRONIC PRODUCTION OF THERMAL IMAGE REPRODUCTION AND APPARATUS FOR CARRYING OUT THE METHOD

The invention relates to a method for the electronic production of thermal image reproduction of an object on a monitor whereby a temperature image of the object is reproduced by means of an infra-red objective on a signal electrode of a camera tube, which electrode responds to temporal changes in temperature, and whereby in said camera an electron beam scans the signal electrode, which operates according to the pyroelectric effect, by lines and images or half-images.

The practice is known of producing a thermal image reproduction by means of camera tubes based on the pyroelectric effect. Relative to FLIER (Forward Looking Infrared) equipment this kind of equipment has the advantage that it requires no cooled detector elements and little or only a very simple mechanism.

Since the pyroelectric effect responds only to changes in temperature, a heat flow modulator must be employed to obtain modulation of the heat radiation. Hitherto, a gear-tooth disc type of modulator has been employed immediately before the signal electrode. In order to obtain a steady image impression the practice is also known of synchronising the geartooth disc with the vertical deflection. In this case the rotary speed of the gear-tooth disc is advantageously determined in such a manner that in addition the flank of the gear-tooth moves at least approximately in time with the vertical deflection of the electronic beam.

Such equipment produces an irregular image impression and a considerable, in part continuous, interference background. It has therefore already been proposed that the image signal occurring when the modulator opens and that occurring when the modulator closes should be stored, that the oppositely polarised image signals thus obtained be added, and that only the differential signal thus obtained be conveyed to the monitor. An excellent picture can thus be obtained but care must be taken that the image modulation proceeds not only synchronously but also parallel with the electronic image scanning. This requires in practice a very large gear-tooth disc as heat flow modulator. Since the temperature resolution of such equipment is not wholly satisfactory in many cases, the practice is also known of increasing the time for vertical scanning from 20 milliseconds to 40 milliseconds. This type of image signal is however no longer TV-compatible.

The object of the present invention is to provide a method and also an apparatus which do not have the above-mentioned disadvantages.

The invention comprises a chopper modulation alternately inhibits and facilitates transmission of thermal energy from a subject to the television camera head viewing the subject. Video information produced during separate first and second time intervals is separately stored. Video information produced during a third time interval between the first and second time intervals is not used. Video information produced during a forth time interval subsequent to the second time interval is also not used. A signal is produced which is a function of the difference between the stored video information corresponding to the first and second time intervals. This difference signal is employed, in combination with appropriate synchronization signals, to drive a television monitor to produce a thermal image of the viewed subject.

Since the picture objects normally occurring have mostly a much higher temperature relative to the heat flow modulator, in order to avoid temperature displacement of the signal electrode, it is of advantage if the time, during which only the heat flow of the object becomes effective on the signal electrode, is smaller, preferably at least half as small as the time during which only the heat flow of the modulator becomes effective on the signal electrode.

In order that a camera can be constructed without any single moving mechanical part, the heat flow modulator is preferably accommodated within the imaging objective.

An especially neat arrangement can be attained if the heat flow modulator is constructed as a rotating heat flow interrupter, in which case the rotary axis is disposed vertical to the optical axis and the cross-section of the heat flow interrupter as seen in a plane containing the rotary axis possesses a profile of at least approximately U-shape, the lateral limbs of which form in each case a section through one of the interrupter surfaces.

The invention further relates to an apparatus for carrying out the method according to the invention, which is characterised in that the heat flow modulator comprises liquid crystal elements. It is of advantage if the heat flow modulator is synchronised with the image or half-image scanning.

The invention will now be described with reference to an example illustrated in the drawings in which:

FIG. 1 shows an arrangement for the thermal reproduction of an object 1 on a monitor 2.

Figure 1:
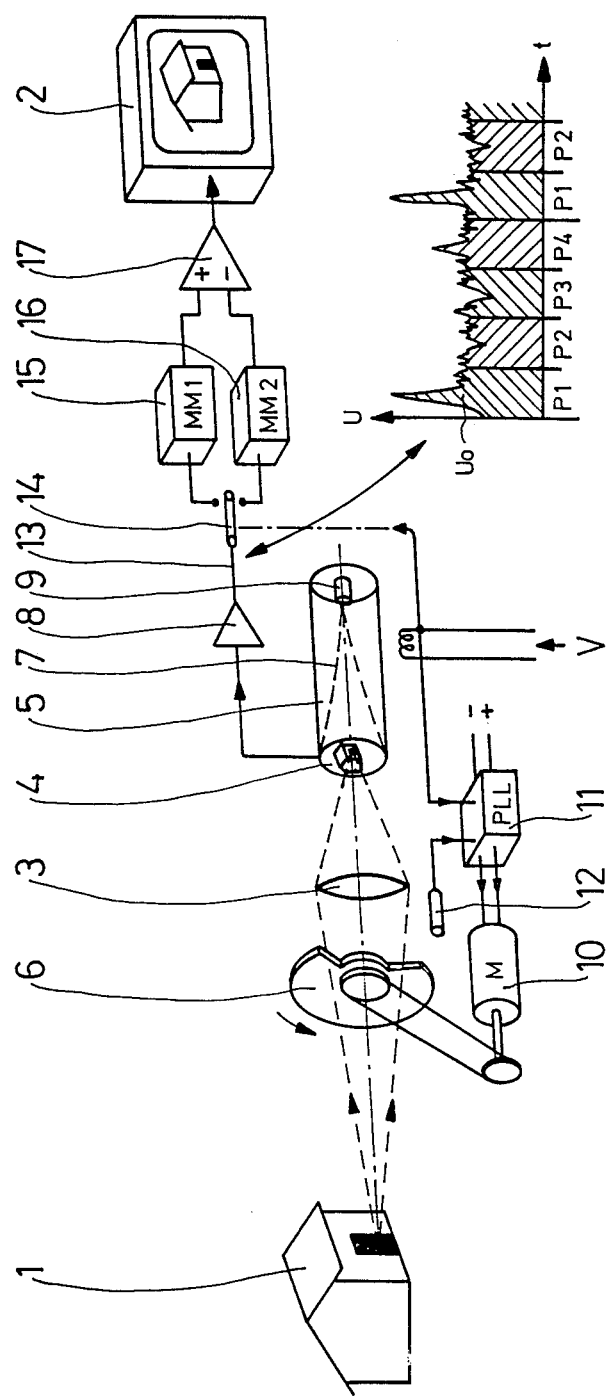
FIG. 1 is a diagrammatic sketch showing an arrangement for carrying out the method according to the invention.

For this purpose an image of the object is produced, by means of an objective 3 operating in the frequency range 8'14 μm, on the signal electrode 4 of a camera tube 5.

The heat flow of each image element of the object 1 on the corresponding image element of the reproduction on the signal electrode 4 is periodically interrupted and released by a rotating sector disc 6.

Since the signal electrode 4 is of pyroelectrically sensitive material and is provided on the side disposed towards the object 1 with an electrically conductive coating, the pyroelectric charge can be converted by means of an electron beam scanning system 7 into a signal current which is converted in the amplifier 8 into an image signal.

Since the signal electrode 4 is highly insulating, it must be provided with a base charge in order to reproduce not only the warmer but also the colder object portions. For production thereof the cathode 9 of the electron beam system is reduced to negative values suring the line return movement. The electrons of the electronic beams thus produced have such a high velocity that secondary electrons are produced and a base voltage $U_o$ of the image signal $U(t)$ is created.

By means of the motor 10 and the circuit 11, and phase-locked to the position sensor 12, the heat flow modulator is synchronised with the vertical deflection V.

Since the heat flow modulator 6 performs one rotation during the time of four vertical scans, an image signal $U(t)$ appears at the point 13.

By means of the switch 14 the image signal $U(t)$ is read into the stores 15 and 16 alternately during the scanning intervals P1 and P3 and is also synchronised with the vertical deflection. The stores 15 and 16 pass the registered image signals $U(P1)$ and $U(P2)$ directly and thrice repeated to the differential circuit 17, which in turn passes the differential signal $U(P1)-U(P2)$, which no longer contains the base voltage $U_o$, to the monitor 2 for image reproduction.

This differential signal $U(P1)-U(P2)$ possesses an increased amplitude compared with the individual signals $U(P1)$ and $U(P2)$. Even a decrease however would be more than compensated by the very much stronger acting elimination of the base voltage and of the standing noise or interference.

Figure 2:
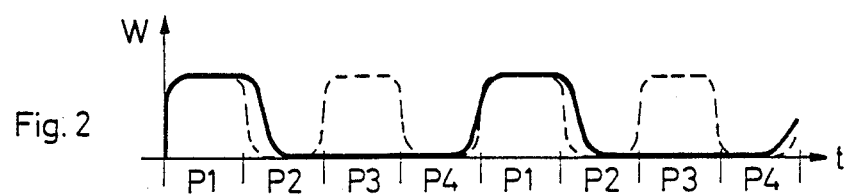
FIG. 2 shows the action of the heat flow modulator of the arrangement shown in FIG. 1 upon the heat flow.

FIG. 2 show (dotted) the effect of a conventional heat flow modulator, and (continuous line) the effect of the modulator used according to the invention on the heat flow which reaches the signal electrode 4 in FIG. 1.

Whereas the heat flow modulator at present in use produces a heat flow which is symmetrical in time, the modulator 6 according to the invention produces only a short-time effect of the heat flow of the object 1, and, as compared therewith, a much longer action of the heat flow leaving the modulator 6.

Figure 3:
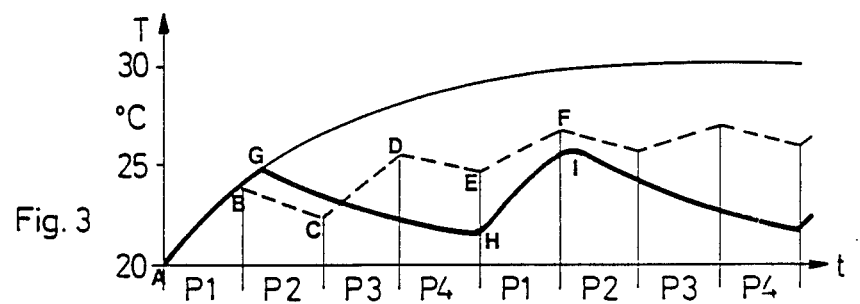
FIG. 3 shows the effect of the heat flow modulator of the arrangement shown in FIG. 1 upon the signal electrode temperature.

FIG. 3 shows, on the same time scale as FIG. 2, the effect (broken line) of a modulator as hitherto employed, and (continuous line) the effect of a modulator 6 operating according to the invention.

For an object element at a temperatur of 40° C. the modulator at present in use, which may have a temperatur of 20° C., produces a temperature course of the corresponding image point on the signal electrode 4 following the curve A—B—C—D—E—F.

The modulator 6 according to the invention on the other hand produces a distinctly more strongly modulated temperature course A—G—H—I for an object point of the same temperature.

Since the pyroelectric effect increases with the temperature, with a camera fanctioning in this way much greater sensitivity is obtained by means of the method according to the invention than was hitherto possible.

Figures 4, 5:
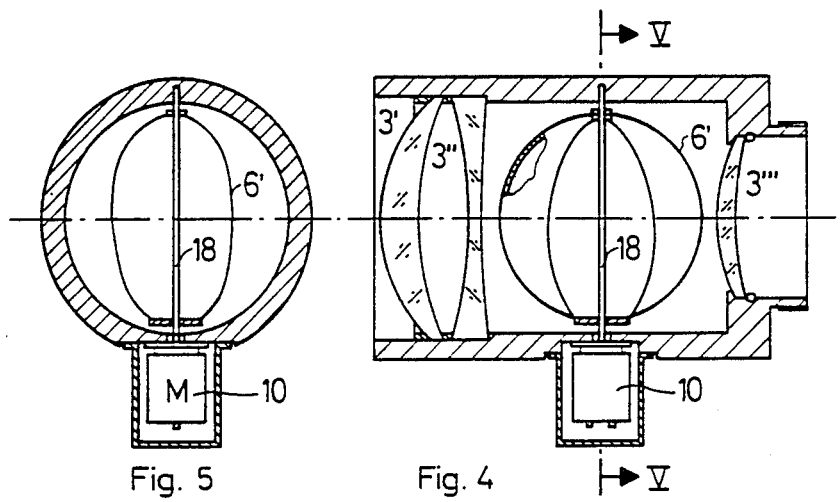
FIG. 4 is a longitudinal section through an arrangement of a heat flow modulator shown by way of example.
FIG. 5 is a cross-section on the line V—V, FIG. 4.

A method of execution of a modulator 6' mounted in the objective 3', 3', 3'is shown in FIG. 4.

In this case, in order to enhance the mechanical rigidity thereof, the modulator 6' is in the form of a double-curved surface, preferably as seen in FIGS. 4 and 5, as a section of the surface of a sphere which is rotated around the rotary axis 18.

We claim:

1. A system for producing images corresponding to temporal changes in the spatial distribution of thermal energy emanating from a subject, said system comprising:
   (a) a thermally sensitive television camera head having a television camera pickup tube having an infrared sensitive means operating in accordance with the pyroelectric effect and responsive to temporal changes in thermal energy incident thereon, means for producing an electron beam, means for scanning the electron beam over at least a portion of said infrared sensitive means to produce a video signal, and means for producing horizontal and vertical synchronization signals;
   (b) a modulator interposed between the subject and said infrared sensitive means, said modulator including means for alternately inhibiting and facilitating the transmission of thermal energy from said subject to said infrared sensitive means in synchronization with said vertical synchronization signal;
   (c) first and second storage means;
   (d) means between said television camera head and said storage means for routing said video signal to said first storage means for storage therein during a first time interval in which said modulator facilitates transmission of thermal energy from said subject to said infrared sensitive means, and for routing said video signal to said second storage means for storage therein during a second time interval, subsequent to said first time interval, during which said modulator inhibits transmission of thermal energy from the subject to said infrared sensitive means;
   (e) means for producing a signal which is a function of the difference between the video signals stored respectively in said first and second storage means;
   (f) means for discarding said video signal produced during a third time interval between said first and second time intervals, and for discarding said video signal produced during a fourth time interval subsequent to said second time interval;
   (g) a monitor coupled to receive, and to produce an image in response to, said difference signal.

2. The system of claim 1, wherein:
said first time interval is substantially less than said second time interval.

3. The system of claim 2, wherein said first time interval is less than half as long as said second time interval.

4. The system of claim 1, wherein:
   (a) said television camera head comprises an imaging objective, and,
   (b) said modulator is located within said imaging objective.

5. The system of claim 1, wherein:
   (a) said modulator comprises a chopper defining interrupter surfaces and has an axis of rotation substantially perpendicular to the optical axis defined by said television pickup tube, and
   (b) the cross section of the modulator taken in a plane containing said axis presents a profile of at least approximately a U-shape, the limbs of which form a section through one of the interrupter surfaces of said chopper.

6. The system of claim 1, wherein:
(said modulator comprises a rotary chopper having interrupter surfaces curved in three dimensions.

7. A method of producing an image corresponding to temporal changes in spatial distribution of thermal energy emanating from a subject, utilizing a television camera head including a pickup tube having an infrared sensitive means response to changes in incident thermal energy and operating in accordance with the pyroelectric effect, an electron gun, means for scanning at least a portion of the infrared sensitive means with an electron beam produced by the gun to produce a video signal, means for producing horizontal and vertical synchronization signals, a thermal modulator between the subject and the infrared sensitive means and a television monitor, said method comprising the steps of:

(a) operating said camera to produce a first video signal during a first time interval in which said modulator facilitates the transmission of thermal energy from said subject to said infrared sensitive means;
(b) storing said first video signal;
(c) producing a second video signal during a second time interval corresponding to a time in which said modulator inhibits transmission of thermal energy from said subject to said infrared sensitive means;
(d) storing said second video signal;
(e) discarding video signal information prdouced by the camera head during a third time interval between said first and second time intervals;
(f) discarding video information produced by the television camera head during a fourth time interval subsequent to said second time interval;
(g) producing a signal which is a function of the difference between said first and second stored video signals, and
(h) applying said difference signal to said monitor for producing an image corresponding to thermal energy emanating from said subject.

8. A system for producing images corresponding to temporal changes in the spatial distribution of thermal energy emanating from a subject, said system comprising:

(a) a thermally sensitive television camera head having a television camera pickup tube having an infrared sensitive means operating in accordance with the pyroelectric effect and responsive to temporal changes in thermal energy incident thereon, means for producing an electron beam, means for scanning the electron beam over at least a portion of said infrared sensitive means to produce a video signal, and means for producing horizontal and vertical synchronization signals;
(b) a modulator interposed between the subject and said infrared sensitive means, said modulator including means or alternately inhibiting and facilitating the transmission of thermal energy from said subject to said infrared sensitive means in synchronization with said vertical synchronization signal;
(c) first and second storage means;
(d) means between said television camera head and said storage means for routing said video signal to said first storage means for storage therein during a first time interval in which said modulator facilitates transmission of thermal energy from said subject to said infrared sensitive means, and for routing said video signal to said second storage means for storage therein during a second time interval, subsequent to said first time interval, during which said modulator inhibits transmission of thermal energy from the subject to said infrared sensitive means;
(e) means for producing a signal which is a function of the difference between the video signals stored respective in said first and second storage means;
(f) means for discarding said video signal produced during a third time interval between said first and second time intervals, and for discarding said video signal produced during a fourth time interval subsequent to said second time interval;
(g) a monitor for producing an image in response to said difference signal, and
(h) means for applying to said monitor said difference signal during at least a portion of each of said first, second, third and fourth time intervals.

9. The system of claim 8, wherein said means for applying said difference signal to said monitor comprises:
(means for applying said difference signal directly to said monitor during at least a portion of one of said time intervals, and repeating the application of said difference signal to said monitor during at least a portion of each of the remaining three respective time intervals.

* * * * *